United States Patent [19]

Lehner et al.

[11] 4,314,922

[45] Feb. 9, 1982

[54] PROCESS FOR THE PREPARATION OF AQUEOUS POLYURETHANE DISPERSIONS

[75] Inventors: August Lehner, Roedersheim-Gronau; Alexander Kud, Enkenbach-Alsenborn; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 231,720

[22] Filed: Feb. 5, 1981

[30] Foreign Application Priority Data

Feb. 11, 1980 [DE] Fed. Rep. of Germany ....... 3005010

[51] Int. Cl.$^3$ .............................................. C08L 75/12
[52] U.S. Cl. .................... 260/29.2 TN; 260/29.2 UA; 525/454; 528/45; 528/48; 528/68; 528/75
[58] Field of Search ............... 260/29.2 TN, 29.2 UA; 528/75, 68, 48; 525/454

[56] References Cited

U.S. PATENT DOCUMENTS 3,437,624 4/1969 Dawn et al. ................ 260/29.2 TN
3,878,077 4/1975 Borden et al. ........................ 528/75

*Primary Examiner*—Theodore E. Pertilla
*Attorney, Agent, or Firm*—David L. Hedden

[57] ABSTRACT

A process for preparing aqueous polyurethane dispersions has been discovered which comprises
(a) forming a polyurethane solution by reacting an organic polyisocyanate in the presence of a solvent with
  (i) an acrylic ester diol having a molecular weight of between 146 and 3,000;
  (ii) an organic polyhydroxyl compound other than (i) having a molecular weight between 400 and 5,000 selected from the group consisting of polyester polyols, polyether polyols, polycarbonates, polylactones, and mixtures thereof; and
  (iii) a chain extender having a molecular weight between 62 and 400 selected from the group consisting of diols, triols, diamines, aminoalcohols, and mixtures thereof;
(b) forming an anionic polyurethane addition product by reacting said polyurethane solution with a mercaptocarboxylic acid salt in the presence of a solvent;
(c) adding water; and
(d) removing the solvent.

The dispersions can be used in a variety of applications. For instance, they can be used to prepare films, coating, and binders.

7 Claims, No Drawings

PROCESS FOR THE PREPARATION OF AQUEOUS POLYURETHANE DISPERSIONS

BACKGROUND OF THE INVENTION

1. Field of the Invention

This invention relates to a process for the preparation of aqueous emulsifier-free anionic polyurethane dispersions. The dispersions are prepared by reacting an organic polyisocyanate with an acrylic ester diol, a polyhydroxyl compound, and a salt of a mercaptocarboxylic acid.

2. Description of the Prior Art

Various methods are known for the production of polyurethane plastics from aqueous emulsifier-free polyurethane latices. German patent application No. 1,495,745, for instance, describes the manufacture of polyurethane plastics from polyurethane latices. The latices are produced by reacting higher molecular polyhydroxyl compounds and polyisocyanates with compounds such as taurine, 2,4-diaminobenzene sulfonic acid, β-hydroxyethane sulfonic acid, tartaric acid and dispersing the resultant polyurethane materials in water. The polyurethane plastics contain 0.02 to 1 percent by weight of carboxylate groups in the polyurethane mass.

Another method for the preparation of polyurethane plastics from aqueous emulsifier-free polyurethane latices is described in German patent application No. 1,495,847. According to this disclosure, polyurethane plastics are obtained with a carboxylate group content of more than 1 percent by weight, and up to 8, preferably 7 percent by weight, of $-CO_2^-$, $-SO_3^-$, $=PO_2^-$ ions in the polyurethane mass. The ionic groups are incorporated into the polyurethane by using compounds having a hydrogen atom reactive with the isocyanate and which have a group capable of forming a salt or a salt-containing group.

According to German patent application No. 1,237,306, polyurethane elastomers are prepared which, following their synthesis, are reacted with cyclic compounds such as succinic acid anhydride which either contain a salt-like group in addition to the ring (with the salt-like group being maintained during the ring-opening reaction which then gives the polyurethane masses the salt-like character), or are reacted with the cyclic compounds which acquire a group capable of forming salts by means of opening the ring and subsequently forming the salt.

SUMMARY OF THE INVENTION

A process for preparing aqueous polyurethane dispersions has been discovered which comprises
 (a) forming a polyurethane solution by reacting an organic polyisocyanate in the presence of an organic solvent with
   (i) an acrylic ester diol having a molecular weight of between 146 and 3,000;
   (ii) an organic polyhydroxyl compound other than (i) having a molecular weight between 400 and 5,000 selected from the group consisting of polyester polyols, polyether polyols, polycarbonates, polylactones, and mixtures thereof; and
   (iii) a chain extender having a molecular weight of between 62 and 400 selected from the group consisting of diols, triols, diamines, aminoalcohols, and mixtures thereof;
 (b) forming an anionic polyurethane addition product by reacting said polyurethane solution with a mercaptocarboxylic acid salt in the presence of a solvent;
 (c) adding water; and
 (d) removing the organic solvent.

The polyurethane dispersions produced according to this invention have a number of particular advantages. Even with the use of aromatic polyisocyanates, they are very well dispersible and can subsequently be cross-linked very well with cross-linking via the sulfur group, for instance with diepoxides, as well as cross-linking via double bonds being possible, if not all of the acrylic ester double bonds are used for incorporating the ionic cores. The cross-linking can take place, for instance, radically, thermally, ionically or via a Michael addition of diamines. A variety of results is possible, and the products have many uses. They can be used for making water and solvent-soluble flexible films with good adhesion; water and solvent-resistant rigid films including very flexible, weakly cross-linked polymers which may be used, for instance, as glues; solvent and water-resistant films produced by strongly cross-linked polymers which are then suited, for instance, for lacquer coating sheet metals; non-cross-linked elastic films which are suitable, for instance, for leather and textile coatings; non-cross-linked or weakly-cross-linked as well as semi-rigid elastic polymerizates which maybe used for coatings on magnetic tapes; low viscous polymers with a high amount of free double bonds which are suited as binders for electro immersion coatings as well as for general plastic coatings.

DESCRIPTION OF THE PREFERRED EMBODIMENT

The first step of this process involves forming a polyurethane solution by reacting an organic polyisocyanate in the presence of a solvent with a mixture of an acrylic ester diol having a molecular weight between 146 and 3,000; a polyhydroxyl compound having a molecular weight between 400 and 5,000; and a chain extender selected from the group consisting of diols, triols, diamine, aminoalcohols, and mixtures thereof. These ingredients will now be described in detail.

Suitable polyisocyanates which may be employed in accordance with this invention to form the polyurethane solution include the commonly-used compounds known from polyurethane chemistry, particularly the diisocyanates. Aromatic as well as aliphatic or heterocyclic diisocyanates may be used, for instance, 4,4-diphenylmethane diisocyanate, dicyclohexylmethane diisocyanate, 1,5-naphthalene diisocyanate, 2,4- and 2,6-toluene diisocyanate, hexamethylene diisocyanate, isophorone diisocyanate, trimethylhexamethylene diisocyanate, and dicyclohexylmethane diisocyanate. In some special cases, partially capped polyisocyanates may also be used which make possible the formation of polyurethanes which are more cross-linked. These include dimeric toluene diisocyanate, or polyisocyanates partially reacted with, for instance, phenol, tertiary butanol, phthalamide, or caprolactam.

Suitable acrylic ester diols which may be employed in this invention to form the polyurethane solution have molecular weights between 146 and 3000 and are reaction products of epoxide compounds with polymerizable olefinically unsaturated carboxylic acids, particularly acrylic and methacrylic acid, with one carboxyl group per epoxide group. Also suitable are reaction products of dicarboxylic acids with polymerizable olefinically unsaturated glycidyl compounds. These compounds are described in German Published Application No. 2,164,386 which is hereby incorporated into this application by reference. Reaction products of hydroxyl-group carrying monoepoxides such as glycidol with methacrylic acid may also be used as unsaturated acrylic ester diols.

Suitable epoxides which can be used in preparing the acrylic ester diols include epoxides with two terminal epoxide groups having the general formula

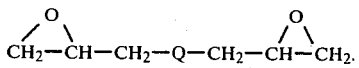

In this formula, Q represents a two bond radical such as

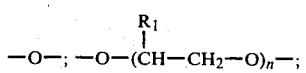

with $n=1-10$, wherein $R_1$ is hydrogen or methyl, $-O-(CH_2)_m-O-$ with $m=1-10$; or a radical of the general formula

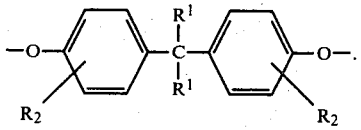

This radical can be derived from 4,4-dihydroxydiphenylmethane, Bisphenol A, or core-substituted derivatives of these compounds such as alkyl, halo, amino and nitro substituted derivatives.

During the later reaction with diisocyanates, the reaction products of the epoxide compounds with acrylic and/or methacrylic acid should be largely bifunctional relative to the hydroxyl groups. With a hydroxyl functionality of >3, there is a danger of cross-linking.

The reaction between the epoxide compounds and the polymerizable olefinically unsaturated acid monomers is a ring opening esterification between the diepoxide compounds and the carboxyl groups of the polymerizable methacrylic acid which may be carried out in the familiar manner similar to the mode of operation set forth in German Published application No. 2,164,386.

The above-referenced epoxide compounds and their reaction products may be used alone or as mixtures. Reaction products of Bisphenol A-diglycidyl ether (for instance, Epikote ®828 by Shell) or glycidol with acrylic or methacrylic acid are preferably suited as the acrylic ester diol.

Suitable organic polyhydroxyl compounds which can be used in conjunction with the acrylic ester diols to prepare the polyurethane solutions have molecular weights between 400 and 5000, preferably between 500 and 4000, and are selected from the group consisting of linear polyesters, polyethers, polycarbonates, polylactones (for instance polycaprolactone), and mixtures thereof. In addition to terminal hydroxyl groups, such compounds may also contain carboxyl, amino or mercapto groups. The polyethers include the polymerization products of ethylene oxide, propylene oxide, tetrahydrofuran, butylene oxide, as well as their mixed or graft polymerization products, as well as the condensates obtained by condensation of multifunctional alcohols or mixtures of these alcohols, or the products obtained by alkoxylation of multifunctional alcohols.

The polyesters include esterification products of adipic acid with $C_2-C_{10}$ alkane diols or oxyalkane diols. The polycarbonates include, for instance, hexane diol carbonates.

Suitable diols, diamines, aminoalcohols or triols which can be used as chain extenders to prepare the polyurethane solutions have molecular weights between 62 and 400. Examples include the commonly-used saturated or unsaturated glycols such as ethylene glycol or condensates of ethylene glycol, butanediol, propylene glycol, trimethylene glycol, neopentyl glycol, diethoxyhydroquinone, butene diol, diethoxyldiane; mono- or bisalkoxylated aliphatic, cycloaliphatic, aromatic or heterocyclic primary and secondary amines such as ethanolamine, N-methylethanolamine, N-butylethanolamine, N-oleylethanolamine, N-cyclohexylisopropanolamine, polyethoxylated N-butylethanolamine; and aliphatic, cycloaliphatic or aromatic diamines such as ethylene diamine, hexamethylene diamine, 1,4-cyclohexylene diamine, benzidine, dimainodiphenylmethane, the isomers of phenylenediamine or hydrazine; and amino alcohols such as ethanolamine, propanolamine, or butanolamine. Multifunctional alcohols such as trimethylol propane, glycerine, etc., should be used in less than 10 equivalent percent. In some cases, water may be used as chain extender or may be used as one of various chain extenders.

The acrylic ester diols, organic polyhydroxyl compounds and chain extenders are generally used in quantities of 100:(10 to 400):(0 to 30), and preferably 100:(20 to 300):(1 to 20) respectively. These ingredients are reacted with the organic polyisocyanate to form the polyurethane solution in quantities such that the ratio of isocyanate groups to reactive hydrogen atoms is from 0.4:1 to 1.3:1, preferably from 0.7:1 to 1.2:1.

As was mentioned, the reaction forming the polyurethane solution is carried out in the presence of an organic solvent. In selecting the solvent, care must be taken that no solvent is used in the manufacture of the polyurethane mass which have functional groups reacting with the isocyanate groups under the reaction conditions. Any solvent may be used for the process according to this invention which does not react with the polyurethane mass and the reaction components. Preferably used solvents are halogenated and non-halogenated hydrocarbons, ketones, alcohols, ethers, esters or nitriles. Representative examples include acetone, methylethyl ketone, isopropanol, tertiary butanol, acetyl nitrile, ethyl acetate, methylene chloride, chloroform, carbon tetrachloride, dimethylformamide, dimethylsulfoxide, tetrahydrofuran or dioxane. Naturally, mixtures of such solvents may also be used.

The polyurethane solutions may be produced by familiar methods. For example, they may be produced on conveyor belts. In this case, the liquid raw materials are placed onto a long belt where they are mixed and transported by means of a geared pump. The belt has a heated and a cold zone. After the incompletely reacted polyurethane has left the belt, it is stored at increased temperatures until the polyaddition reaction has completed and is then dissolved.

The polyurethane solution may also be prepared by a single stage reaction. In this case, all substances participating in the reaction in concentrations of 20 to 90 percent, predominantly 30 to 70 percent, are weighed into the reaction vessel in solvent and are heated to 20° C. to 130° C., predominantly to 30° C. to 90° C. The polymerization is completed when the desired NCO value has been reached (with an excess of isocyanate) or when all isocyanate groups have been reacted (with an excess of hydrogen active compounds).

The polyurethane solutions may also be prepared by a two stage reaction. In this case, the preliminary reaction of polyol and diisocyanate is carried out in part of the solvent, predominantly at 30° C. to 90° C. Following this, the chain is extended with a diol and triol. The further mode of operation corresponds with a single stage reaction.

The preparation of the polyurethane solution can be accelerated with polyurethane catalysts as they are known from the polyurethane chemistry. Commonly used catalysts include, for instance, metal organic compounds such as butyltin dilaurate, tertiary amines or triazines.

The polyurethane solution may contain 0.1 to 10, preferably 0.3 to 5 percent by weight of free isocyanate groups. However, in another preferred version, the polyurethane does not contain any unreacted isocyanate groups.

In the next step of the process, mercaptocarboxylic acid salts are mixed with the polyurethane solutions to form an anionic polyurethane addition product. These salts are added to the acrylate double bonds of the acrylic ester via mercaptoether bridges.

Suitable mercaptocarboxylic acids which can be used to prepare mercaptocarboxylic acid salts are carboxylic acids having one mercapto group. Particularly well suited are mercaptocarboxylic acids, where the mercapto group is in an $\alpha$- or $\beta$-position to the acid groups. The mercaptocarboxylic acids may be aliphatic, cycloaliphatic, araliphatic, or aromatic. They may, for instance, be mercaptoacetic acid, mercaptopropionic acid, mercaptobutyric acid, mercaptolinoleic acid, mercaptotrimethylacetic acid, mercaptocyclohexanoic acid, mercaptophenylacidic acid, mercaptobenzoic acid, mercaptotoluenic acid, mercaptochlorobenzoic acid. Other suitable mercaptocarboxylic acids are reaction products of mercaptoethanol with poly- or di-carboxylic acid anhydrides, for instance, with succinic acid anhydride, maleic acid anhydride, phthalic acid anhydride, or trimellitic acid anhydride, when this results in the mercapto group remaining free. Particularly preferred is mercaptoacetic acid.

Many compounds can be used to transform the mercaptocarboxylic acids into their salt form. Organic bases may be used for this purpose. Representative examples include monofunctional primary, secondary and tertiary amines such as methylamine, diethylamine, trimethylamine, triethylamine, ethylamine, tributylamine, pyridine, methylethylamine, diethylmethylamine, aniline, toluidine; alkoxylated amines such as ethanolamine, diethanolamine, triethanolamine, methylenediethanolamine, oleodiethanolamine; as well as polyfunctional amines where the individual amino groups may have different basisity such as N,N,-dimethylethylene diamine, $\alpha$-aminopyridine, N,N-dimethylhydrazine. Preferably used are amines having a boiling point below 120° C. and among those the tertiary amines such as trimethylamine or triethylamine are preferred. Inorganic bases which are basically reacting or compounds which dissociate into base compounds may also be used to transform the mercaptocarboxylic acids into their salt form. Representative examples include ammonium, alkali or alkaline earth metal hydroxides, carbonates, and oxides. Preferred compounds are ammonium, potassium, and sodium hydroxide.

The polyurethane solution is reacted with such quantities of mercaptocarboxylic acid salts that the content of carboxylate groups of the addition product amounts to 0.5 to 10, preferably 1 to 8 percent by weight, and such that from 10 to 100 percent of the acrylate double bonds have been reacted.

For the addition of the mercapto groups, the mercaptocarboxylic acid salts may be used in solid form or in solution. The use of solution is preferred. The solvents should not prevent the addition of the mercapto group. In special cases, however, it may be advantageous if at least part of the solvent can react with the isocyanate groups possibly still present in the polyurethane by extending or terminating the chains. Examples of solvents include halogenated hydrocarbons, ketones, alcohols, esters, water, ether, and diol-mono(meth-)acrylate. Advantageously, the reactive solvents are in most cases used in subordinate quantities only. Suitable reactive solvents are the chain extenders described for the polyurethane manufacture Particularly well suited as nonreactive solvents are acetone, methylethylketone, tetrahydrofuran, diethylether, tertiary butanol, and toluene.

Advantages of the incorporation of the ionic group according to the process of this invention by adding mercapto-acid salts to double bonds of acrylates are that the reaction can be carried out at low temperatures (0° C. to 120° C., primarily 0° C. to 60° C.) and that the reaction takes place very quickly. At 35° C., the addition is completed, for instance, in less than 10 minutes. The feed time may be varied within wide limits. However, since the reaction is completed very quickly, feed times of less than 10 minutes, even 2 minutes, are possible.

Following this, the water is added and the organic solvent is removed by distillation resulting in a uniform dispersion. The amount of water employed in the formation of the dispersion is not critical. However, when too small an amount of water is employed, dispersions which are obtained which are too thick to handle readily. On the other hand, dispersions which are too dilute are uneconomical to handle due to their excess volume.

In order to improve the properties (for instance increasing the thermal stability and hardness), multifunctional polyisocyanates may be added prior to adding the water. Suitable multifunctional polyisocyanates are described, for instance, in German Pat. Nos. 1,090,196, 1,101,394, 1,222,067.

Unless indicated otherwise, the parts and percentages listed in the examples are parts and percentages by weight.

EXAMPLE 1

In a reaction vessel, 207 parts of a polycaprolactone having a molecular weight of 830, 18 parts of 1,4-butanediol, and 162 parts of 4,4'-diphenylmethane diisocyanate are dissolved in 388 parts of tetrahydrofuran. After adding 0.25 part of dibutyltin dilaurate and 0.25 part of dibutyltin octoate, the mixture is heated to 60° C. and is agitated at this temperature for one hour. Following this, 194 parts of acetone are added and the mixture is stirred at 60° C. until the isocyanate content amounts to 1.7 percent. At this point, 78 parts of Epikote 828-diacrylate in 117 parts of acetone are added. Epikote 828- diacrylate is the reaction product of 1 mol of Epikote 828, manufactured by Shell, and 2 moles of acrylic acid. The mixture is agitated at 60° C. until the isocyanate content is 0.1 percent.

The reaction is stopped by adding ethanolamine. The amount of ethanolamine added can be calculated based on the isocyanate content remaining. When the isocyanate content is 0 percent, a mixture of 25.9 parts of 80 percent mercaptoacetic acid, 28.2 parts of triethylamine, and 16 parts of acetone are added dropwise. After a reaction period of 2 hours at 60° C., 104 parts of Desmodur ®L (the polyaddition product of 1 mole trimethylolpropane and 3 moles toluene diisocyanate produced according to German Pat. No. 1,090,196 of Bayer AG) (75 percent solution is acidic ester) are stirred in and 5 minutes later the mixture is dispersed with 700 parts of water. The solvent is removed by distillation under a vacuum.

The polyurethane films produced from this dispersion have the following properties:

| Values at | 20° C. | 50° C. |
| --- | --- | --- |
| Tear Strength | 33 N/mm² | 16 N/mm² |
| Elongation | 380% | 320% |
| Elasticity Modulus | 56 N/mm² | 34 N/mm² |
| Pendulum Hardness (according to Koenig) | 25 sec. | 19 sec. |

EXAMPLE 2

In a reaction vessel, 335 parts of a polyester of adipic acid and 1,4-butanediol (molecular weight 1000), 15.6 parts 1,4-butanediol, 1.34 parts of trimethylolpropane, 243 parts of Epikote 828-diacrylate and 312.5 parts of 4,4'-diphenylmethane diisocyanate were dissolved in 1368 parts of tetrahydrofuran. Then, 0.35 parts of dibutyltin dilaurate, and 0.5 part of dibutyltin octoate were added. The mixture was heated to 60° C. and agitated at this temperature until the NCO content was 1.4 percent.

At this point, a mixture of 73.6 parts of mercaptoglycolic acid, 80.8 parts of triethylamine, and 42 parts of acetone were quickly added.

After 30 minutes, 15 parts of water were stirred in and the mixture was maintained at 65° C. for another three hours.

Thereafter, the mixture was dispersed with water and the solvent was removed by distillation under vacuum. The solids content is 27 percent.

| Film values at | 20° C. | 50° C. |
| --- | --- | --- |
| Tear Strength | 36 N/mm² | 41 N/mm² |
| Elongation | 462% | 535% |
| Elasticity Modulus | 131 N/mm² | 86 N/mm² |
| Pendulum Hardness | 30 sec. | 26 sec. |

EXAMPLE 3

At room temperature, 78 parts of Epicote-828-diacrylate, 16.8 parts of 4,4'-diphenylmethane diisocyanates, and 39.3 parts of 4,4'-dicyclohexylmethane diisocyanate were dissolved in 134.1 parts of acetone, and the mixture was heated to 50° C. After reacting this temperature, 76.9 parts of 4,4'-dicyclohexylmethane diisocyanate, and a mixture of 166 parts of a polycaprolactone having an OH number of 135, 13.5 parts of 1,4-butanediol, and 250 parts of acetone were added.

After adding 0.1 parts of dibutyltin dilaurate, the mixture was agitated at 50° C. until the isocyanate content had become less than 0.1 percent. The NCO/OH reaction was stopped with the calculated quantity of ethanolamine.

Subsequently, a mixture of 25.9 parts of 80 percent mercaptoglycolic acid, 28.2 parts of triethylamine, and 15.7 parts of acetone are added dropwise into the mixture within a period of two minutes.

Twenty minutes later, 42 parts of Desmodur ®L are stirred in and after 5 minutes, the mixture is dispersed with 750 milliliters of water while being stirred vigorously. The solvent was subsequently removed by distillation under vacuum.

| Film values at | 20° C. |
| --- | --- |
| Tear Strength | 36 N/mm² |
| Elongation | 275% |
| Elasticity Modulus | 130 N/mm² |
| Pendulum Hardness | 45 sec. |

EXAMPLE 4

In a reaction vessel, 207 parts of polycaprolactone (OH number 135), 18 parts of 1,4-butanediol and 162 parts of 4,4'-diphenylmethane diisocyanate were dissolved in a solvent mixture consisting of 194 parts of acetone and 388 parts of tetrahydrofuran. After adding 0.25 part of dibutyltin dilaurate and 0.25 part of dibutyltin dioctoate, the mixture was heated to 60° C. while being stirred.

After the isocyanate content had dropped to 1.4 to 1.7 percent, a solution of 78 parts of Epicote 828 diacrylate in 117 parts of acetone was added dropwise within a period of 30 minutes. After a reaction time of one hour at 60° C., the NCO/OH reaction was stopped with ethanolamine. At this point, a mixture of 25.9 parts of 80 percent mercaptoglycolic acid, 28.2 parts of triethylamine, and 15.7 parts of acetone were quickly added.

After a reaction period of 2 hours, 104 parts of Desmodur L were introduced and the mixture was dispersed with 700 parts of water two minutes later.

The solvent was subsequently removed by distillation under vacuum.

| Film values at | 20° C. | 50° C. |
| --- | --- | --- |
| Tear Strength | 33.3 N/mm² | 16 N/mm² |
| Elongation | 355% | 452% |
| Elasticity Modulus | 56 N/mm² | 34 N/mm² |
| Pendulum Hardness | 25 sec. | 19 sec. |

EXAMPLE 5

In a reaction vessel, 110 parts of polytetrahydrofuran (molecular weight 2000), 4.0 parts of trimethylolpropane, 490 parts of Epicote 828-diacrylate, and 212 parts of diphenylmethane diisocyanate are dissolved in 800 parts of tetrahydrofuran. After adding 0.25 parts of dibutyltin dilaurate and 2.5 parts of dibutyltin octoacte, the mixture is stirred at 60° C. until the isocyanate content amounts to zero percent. Within a period of 5 minutes, a mixture of 87 parts of 80 percent mercaptoacetic acid, 77 parts of triethylamine and 42 parts of acetone are added dropwise. After one hour at 60° C., water is added until a dispersion will result. The solvent is removed under vacuum. The solids content is 32.6 percent. The polymer still contains acrylic ester double bonds and may be cross-linked via these bonds.

The embodiments of the invention in which an exclusive property or privilege is claimed are defined as follows:

1. A process for preparing an aqueous polyurethane dispersion which comprises
   (a) forming a polyurethane solution by reacting an organic polyisocyanate in the presence of an organic solvent with
      (i) an acrylic ester diol having a molecular weight of between 146 and 3,000;
      (ii) an organic polyhydroxyl compound other than (i) having a molecular weight between 400 and 5,000 selected from the group consisting of polyester polyols, polyether polyols, polycarbonates, polylactones, and mixtures thereof; and
      (iii) a chain extender having a molecular weight between 62 and 400 selected from the group consisting of diols, triols, diamines, aminoalcohols, and mixtures thereof;
   (b) forming an anionic polyurethane addition product by reacting said polyurethane solution with a mercaptocarboxylic acid salt in the presence of a solvent;
   (c) adding water; and
   (d) removing the organic solvent.

2. The process of claim 1 wherein the ratio of isocyanate groups to reactive hydrogen atoms in forming the polyurethane solution is 0.7:1 to 1.2:1.

3. The process of claim 1 wherein the polyurethane solution is reacted with such quantities of the mercaptocarboxylic acid salts that the content of carboxylic groups of the addition product is 0.5 to 10 percent by weight.

4. The process of claim 1 wherein the polyurethane solution is reacted with such quantities of mercaptocarboxylic acid salts that no unsaturation remains.

5. The process of claim 1 wherein the amount of mercaptocarboxylic acid salt reacted with the polyurethane solution is such that 10 to 95 percent of the carbon to carbon double bonds of the acrylic ester diols have been reacted.

6. The process of claim 1 wherein the mercaptocarboxylic acid is mercaptoacetic acid.

7. An aqueous polyurethane dispersion prepared in accordance with claim 1.

* * * * *